Sept. 14, 1954
I. S. WATKINS
2,689,106
VALVE ASSEMBLY
Filed Nov. 14, 1949
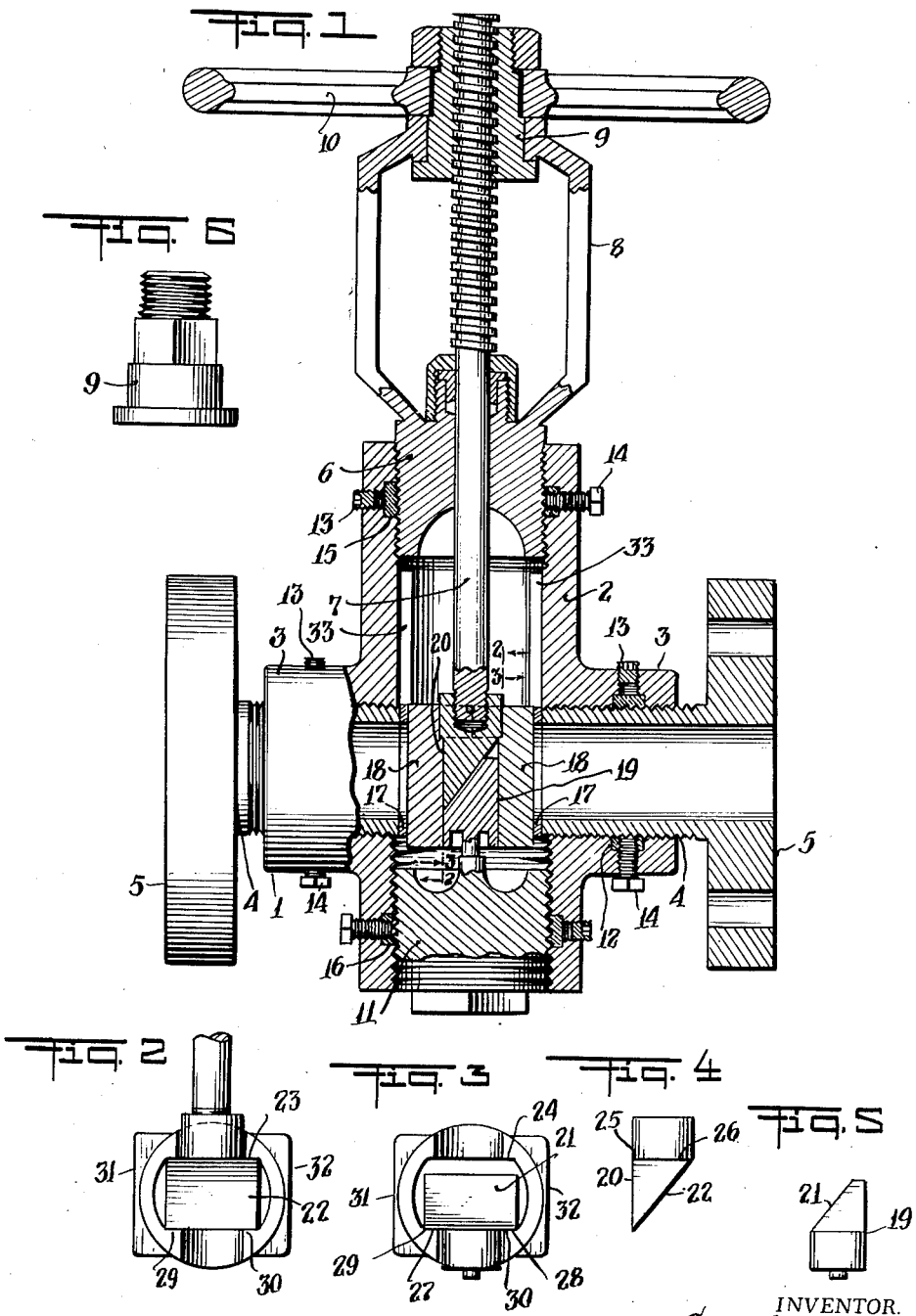
INVENTOR.
Ivan S. Watkins
BY
E. V. Hardway
ATTORNEY Patented Sept. 14, 1954

2,689,106

UNITED STATES PATENT OFFICE 2,689,106

VALVE ASSEMBLY

Ivan S. Watkins, Houston, Tex., assignor of one-half to O. L. Miller, Harris County, Tex.

Application November 14, 1949, Serial No. 126,933

2 Claims. (Cl. 251—200)

1

This invention relates to a valve assembly.

It is an object of the present invention to provide an assembly of the character described embodying a novel type of packing for packing the joints of the casing against leakage.

It is a further object of the invention to provide a valve casing whose joints are packed in such manner that the packing can be readily renewed in case a leak develops.

Another important object of the present invention is to provide, in a valve assembly, a novel type of valve casing which is of very cheap construction and whose parts are not subjected to wear either from the movable parts of the valve assembly or from the liquid flowing through the line.

A further feature of the invention resides in the provision of a valve assembly that may be installed in a line without changing the position of the connecting flanges on the pipe sections and said assembly may be rotated about the axis of the couplings to make the necessary adjustments.

It is also an object of the present invention to provide a valve assembly so constructed that the gate and stem may be removed from either end of the casing body and which also permits the easy removal and replacement of the valve seats without the necessity of removing the gates or valves.

The invention also embodies the improvement whereby the spreader mechanism for the gates or valves may be finally adjusted to secure the accurate fitting of the valves against the seats; and the valve also embodies a construction whereby the seats may be adjusted from without the casing to assure such fitting.

Another valuable feature of the valve assembly resides in the fact that different series of flanges may be used as desired without changing the valve body.

Another important object of the present invention resides in the provision of a valve in which all working parts may be conveniently removed and replaced.

Other objects and advantages will be apparent from the following specification, which is illustrated by the accompanying drawings, wherein:

Figure 1 is a side elevation of the assembly, partly in section;

Figure 2 is a fragmentary, elevational view of the valve taken on the line 2—2 of Figure 1;

Figure 3 is a fragmentary elevation of the valve taken on the line 3—3 of Figure 1;

Figures 4 and 5 are side views, respectively, of the expander wedges employed; and Figure 6 is an elevational view of the actuating nut employed.

Referring now more particularly to the draw-

2 ings, the numeral 1 designates the valve casing as a whole. In the present illustration, the casing is formed of a tubular body 2 having the opposing, lateral connections 3, 3 arranged opposite each other. There are the couplings 4, 4 which are tubular in form and whose inner ends are externally threaded and screwed into said connections.

When fully screwed home, the inner ends of the connections are approximately flush with the inner wall of the casing 1. The outer ends of the connections are provided with means for the connection of pipe thereto. In the present illustration, the connections are provided with outer end flanges 5, 5 for that purpose.

Screwed into one end of the casing body 2 there is a closure plug 6 having an axial bearing to receive a valve rod 7, and an open work case 8 is secured to the plug, and its outer end carries a bearing in which the nut 9 is mounted to rotate. The nut may be rotated in any preferred manner, as by a handwheel 10, and said nut has a threaded connection with the valve rod 7, and upon rotation of the nut said valve rod, and the valve, are moved longitudinally to open and closed position.

The other end of the casing body 2 is closed by a closure plug 11 screwed thereon. It is, of course, desirable, and in most cases absolutely essential, that the casing joints do not leak. Consequently, a novel, and superior, type of seal has been provided for this purpose.

The connections 3, 3 are provided with inside, annular grooves, as 12, which may be filled with any suitable type of sealing material, preferably a fluid type sealing material. Any preferred type of fluid sealing material may be used, such as a fluid sealing material composed of fiber asbestos, asphalt, shredded lead and a heavy grease. This sealing material may be forced into the grooves 12 around the couplings 4. In order to do this the plug 13 may be removed and a suitable force pump then attached and the sealing material forced into the grooves 12 and the plug 13 then replaced. The couplings 4 are held against turning by suitable set bolts threaded through the casing and engageable with the couplings 4; also the plugs 6 and 11 are secured in place in a similar manner.

Around these plugs 6 and 11 and cut into the wall of the main body 2 are the grooves, 15, 16. These grooves should be filled with sealing material in the manner hereinabove explained. Should a leak develop additional sealing material may be readily supplied.

On the inner ends of the couplings 4 there are the hard metal valve seats 17, 17 and cooperating with said seats are the disc-like valves 18, 18 which are designed to be spread and seated against said seats to close them. Between the valves 18 there are the lower and upper wedges 19, 20 having the diagonal contacting faces 21, 22. There are the shoulders 23, 24 on valve 18 which hang on the laterally extended shoulders 25, 26 of the wedge 20 and the wedge 19 has the laterally extended shoulders 27, 28 which hang on shoulders 29, 30 of the valves so that the assembly will move up and down together and the valves have laterally extended wings 31, 32 which work in vertical grooves as 33 in the inside wall of the casing so as to maintain the valves in proper alignment with the flow way through the couplings.

The wedge 20 has a threaded connection with the valve rod 7 and is also pinned thereto.

The nut 9 may be turned in one direction to elevate the valve rod or move it outwardly, and the valve will be correspondingly moved out of alignment with said passageway to open the valve. Upon rotation of the nut 9 in the other direction the valves will be moved into alignment with said passageway and the extension 19 will seat on the stop 34 of the plug 11 and upon further rotation of the nut 9 the wedge 20 will be moved further downwardly to expand said valves to form tight non-leaking contacts with the valve seats 17.

The valve assembly may be installed in a line without changing position of the connecting flanges on the adjacent sections of the line and in making the installation, if necessary the set screws 14 may be released from the couplings 4 and the casing then turned about the axis of said couplings so as to make the necessary longitudinal adjustment of the coupling relative to the pipe and the set screws 14 may then be tightened up. Adjustments of this type will ordinarily be to a small degree and will not affect the seating of the valve and it may be here stated that the threads connecting both couplings to the casing are pitched in the same direction.

An additional advantage of this construction is that the seats 17 may not only be adjusted relative to each other but they may be removed for repairs and replacements without the necessity of removing the valves; when the valves are also adjusted so that they will fit the seats accurately when in the closed position the plug 11 may then be adjusted to the proper position and secured in that position by its set screw 14 thus accomplishing the accurate and final adjustment of the valves relative to the seats.

In a valve assembly of the type described all working parts are conveniently removeable and replaceable and the valve seats are adjustable from without the valve casing.

A very convenient feature of this type of valve assembly also is the fact that if the flanges should not match with the flanges of the pipe line they can be easily changed without changing the valve casing.

The drawing and description are illustrative merely and the broad principle of the invention will be defined by the appended claims.

What I claim is:

1. A valve assembly comprising, a valve casing which is formed with a tubular body and lateral tubular connections on the body, tubular couplings threaded into said connections for adjustment inwardly and outwardly laterally of the body, upper and lower plugs screwed into the ends of the body for adjustment inwardly and outwardly longitudinally of the body, there being a groove between each plug and the body and between each connection and coupling, sealing material filling said grooves, means providing for the inlet of packing into the grooves, valve seats on the inner ends of the couplings, valves slidable longitudinally in the body to an open position to permit the passage of fluid therethrough and to a closed position between the valve seats, an upper wedge between the valves moveable downwardly relative thereto and on which the valves are supported when in open position, a lower wedge carried by the valves and moveable longitudinally relative thereto said lower wedge being engageable with said lower plug to limit downward movement of the lower wedge when the valves are in said closed position, said upper wedge being movable downwardly after the lower wedge engages the lower plug to move the valves toward the valve seats.

2. A valve assembly comprising, a valve casing which includes a tubular body and opposing tubular body and opposing tubular connections on the body, upper and lower plugs screwed into the ends of the body for adjustment inwardly and outwardly longitudinally of the body, tubular couplings screwed into the connections for adjustment inwardly and outwardly laterally of the body, valve seats on the inner ends of the couplings and movable therewith to vary the distance between the seats, there being a groove between each plug and the body and between each connection and coupling, sealing material filling said grooves, means providing for the inlet of packing into the grooves, valves slideable longitudinally in the body into and out of a position between the couplings and laterally movable when in said position to engage said seats to close said couplings, cooperable upper and lower wedges between the valves and slideably connected to the valves for limited longitudinal movement relative thereto, said wedges being movable longitudinally relative to each other to move the valves toward the seats, said upper wedge being engageable with said valves upon movement of said valves out of said closing position to support said upper wedge out of engagement with said lower wedge, means on said lower plug engageable with said lower wedge when the valves reach said position to limit further movement of said lower wedge toward said position, and means movable longitudinally in the casing and connected to the upper wedge to thereafter move said upper wedge to cause said wedges to move the valves toward the seats.

References Cited in the file of this patent

UNITED STATES PATENTS

| Number | Name | Date |
|---|---|---|
| 281,081 | Kelly | July 10, 1883 |
| 453,555 | Folly | June 2, 1891 |
| 554,205 | Vincent | Feb. 4, 1896 |
| 671,614 | Shirley | Apr. 9, 1901 |
| 769,831 | Ogden | Sept. 13, 1904 |
| 1,502,473 | Joule | July 22, 1924 |
| 1,836,374 | Kelly | Dec. 15, 1931 |
| 1,933,182 | Pagon | Oct. 31, 1933 |
| 2,079,896 | Brosius | May 11, 1937 |
| 2,304,491 | Allen | Dec. 8, 1942 |
| 2,469,074 | Mueller | May 3, 1949 |

FOREIGN PATENTS

| Number | Country | Date |
|---|---|---|
| 508,737 | Germany | 1929 |